J. T. SHEROD.
COMBINED DRILL PRESS AND BORING MACHINE.
APPLICATION FILED MAR. 19, 1909.
962,474.
Patented June 28, 1910.
4 SHEETS—SHEET 3.
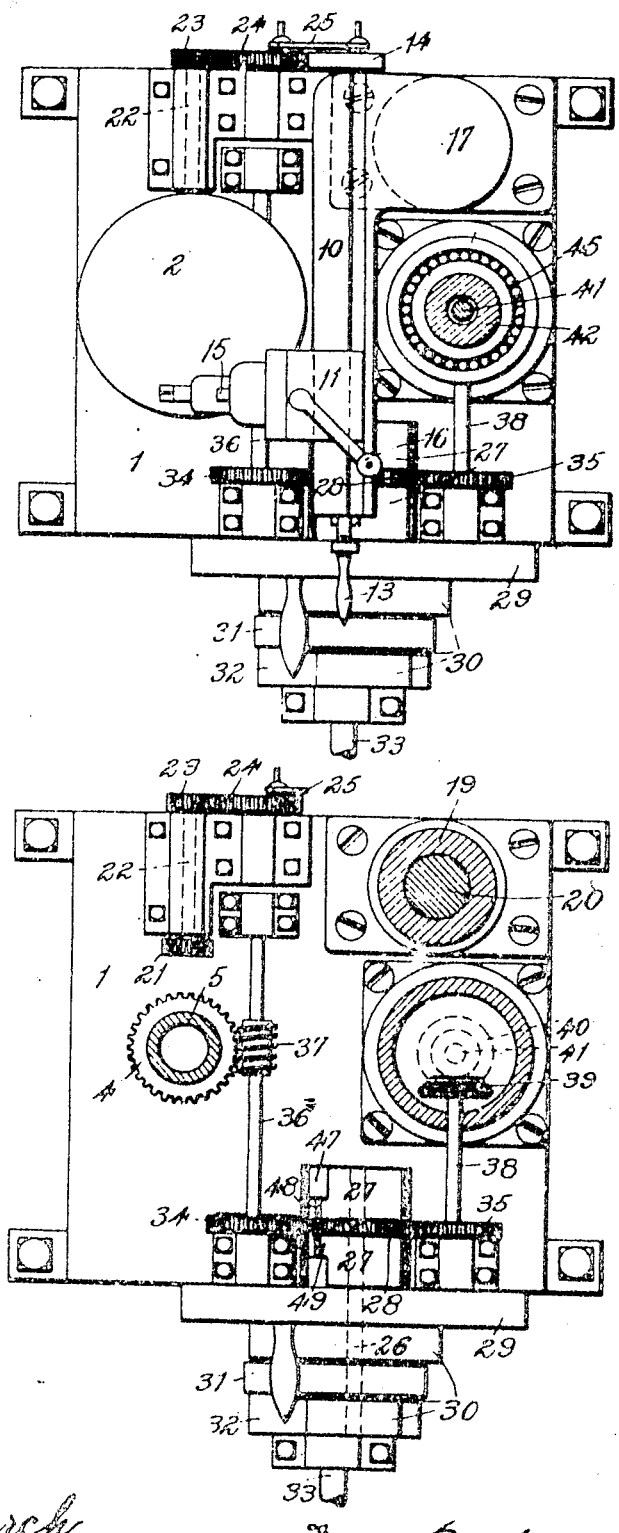

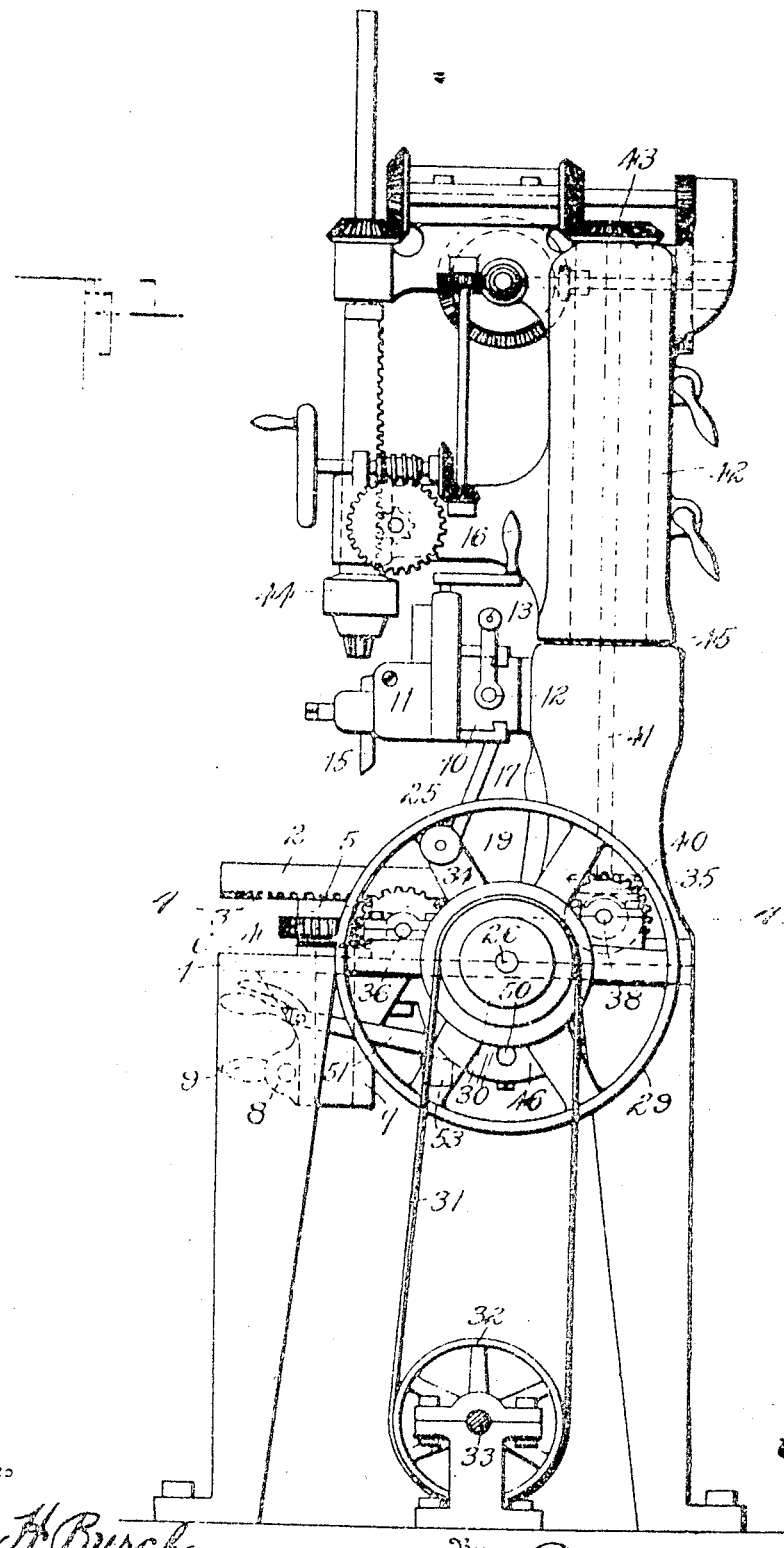

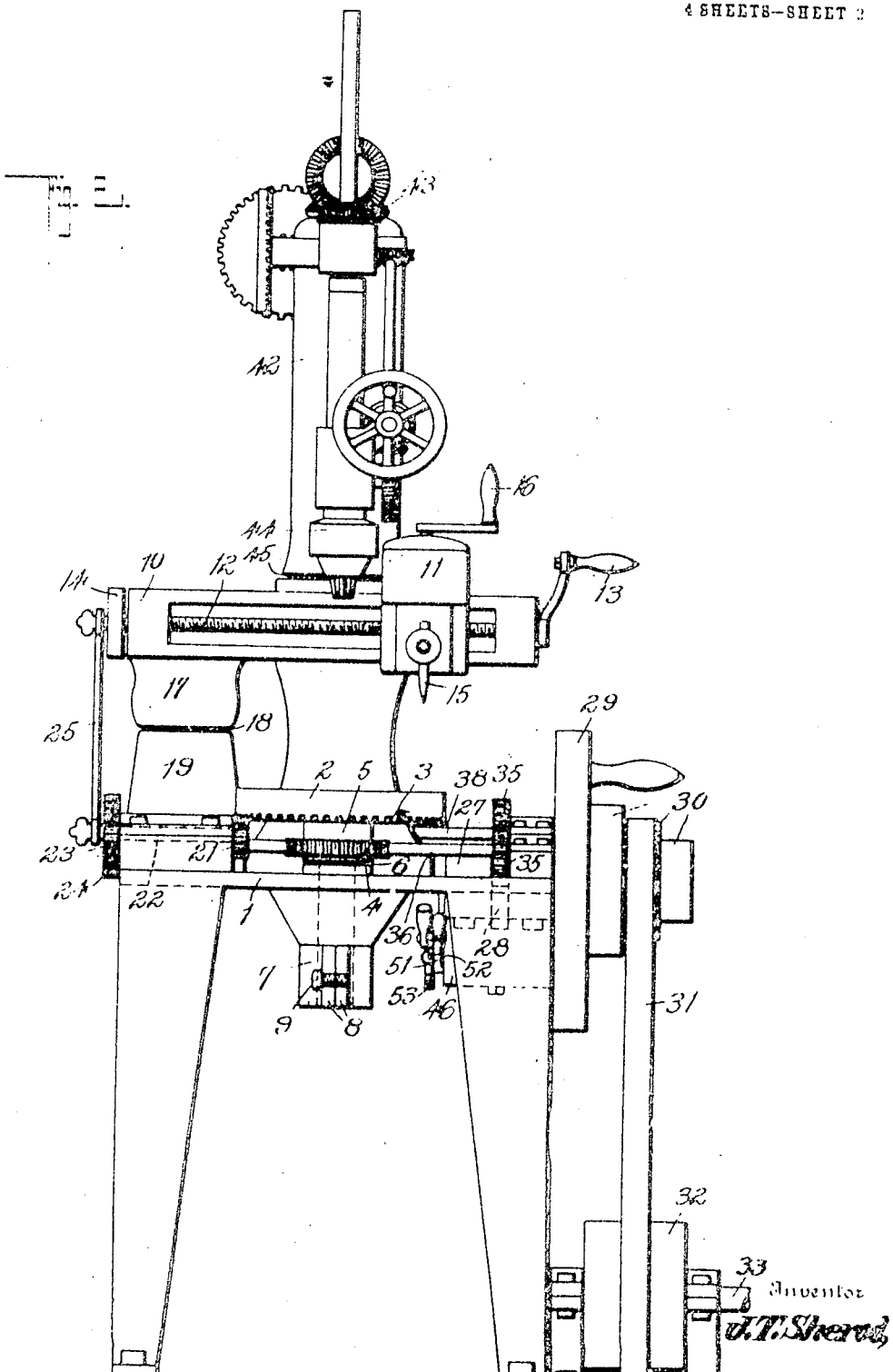

J. T. SHEROD.
COMBINED DRILL PRESS AND BORING MACHINE.
APPLICATION FILED MAR. 19, 1909.
962,474.
Patented June 28, 1910.
4 SHEETS—SHEET 4.
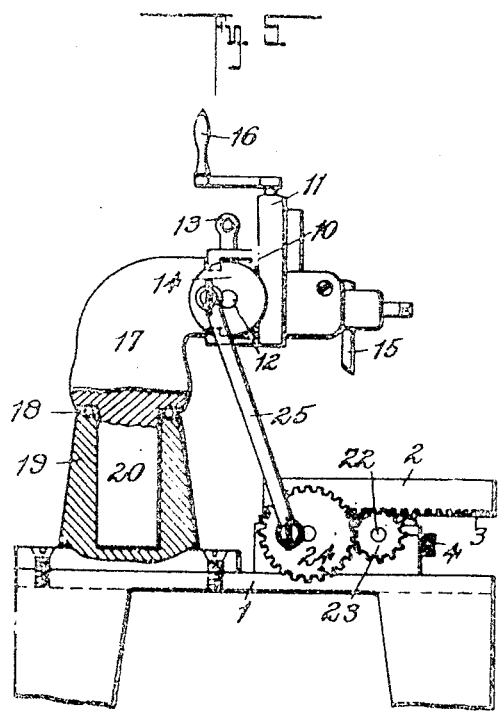
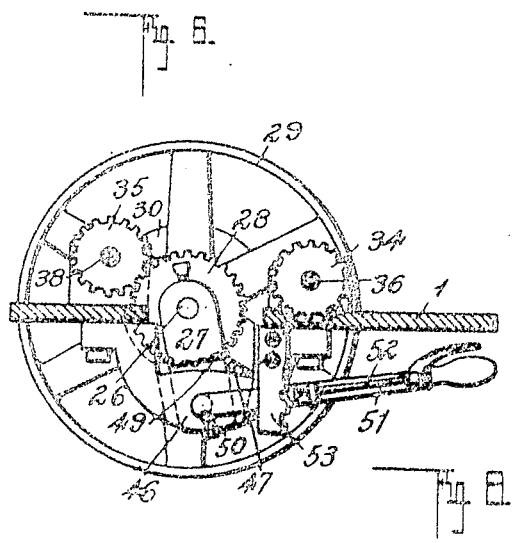
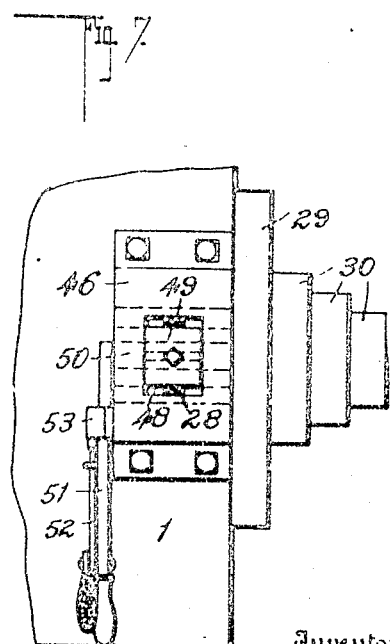
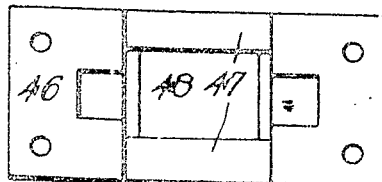

UNITED STATES PATENT OFFICE.

JOHN T. SHEROD, OF KANSAS CITY, KANSAS.

COMBINED DRILL-PRESS AND BORING-MACHINE.

962,474.

Specification of Letters Patent. Patented June 28, 1910.

Application filed March 19, 1909. Serial No. 484,386.

*To all whom it may concern:*

Be it known that I, JOHN T. SHEROD, a citizen of the United States, residing at Kansas City, in the county of Wyandotte and State of Kansas, have invented a new and useful Improvement in Combined Drill-Presses and Boring-Machines, of which the following is a specification.

This invention relates to a combined drilling and boring machine which may be operated either by hand or by foot power, or driven by any suitable motor.

The object of the invention is a machine of this kind which will occupy only a small amount of space, and which is designed for use in connection with round houses, locomotive repair shops, and similar places where an easily operated metal working machine is daily required.

With the above object in view, my invention consists in the novel features of construction hereinafter described, pointed out in the claims and shown in the accompanying drawings, in which:

Figure 1 is a side elevation. Fig. 2 is a front elevation. Fig. 3 is a plan view, the drill press being removed. Fig. 4 is a section on the line 4—4 of Fig. 1, certain gears being shown in plan. Fig. 5 is a detail rear view, the bearings for a tool stand being shown in section. Figs. 6, 7 and 8 are detail views of a feed shifting mechanism and its bearings.

In these drawings 1 represents the bed plate of a suitable stand, mounted above which is a face plate or chuck 2 provided upon its under side with gear teeth 3, and having a worm gear 4 formed upon its depending shaft 5. The lower portion of the shaft is reduced below the worm gear thereby forming a suitable shoulder which turns upon ball bearings 6. The reduced portion of the shaft is journaled in a split sleeve 7, the sleeve being provided with laterally extending lugs 8 through which works a screw 9, and by tightening said screw and drawing the lugs together, the shaft 5 is clamped in the said sleeve 7 and the face plate 2 locked against rotation. A tool head stand 10 swings in a horizontal plane above the face plate 2 and carries a slidable tool holder 11 which is moved along the stand 10 by means of a threaded feed rod 12 which is provided with a handle 13 at one end and a drive wheel 14 at the opposite end. The head 11 carries a suitable cutting tool 15 adjusted by means of a handle 16. This tool head is of the ordinary type, and any of the tool heads now in common use can be employed. The stand 10 is provided with a depending boss 17 which travels upon ball bearings 18 carried by an upright post or standard 19 which rises from a corner of the bed plate 2, the said post receiving a vertical shaft 20 formed integral with the boss 17, the details of this mounting being shown in Fig. 5.

The teeth 3 of the face plate 2 mesh with a gear wheel 21 carried by a shaft 22 which in turn carries a gear wheel 23 which meshes with a larger gear wheel 24. A pitman 25 connects the gear wheel 24 with the drive wheel 14 of the feed rod 12, thereby connecting the face plate and the tool head 11 so that the tool may be run in unison. The pitman 25 is detachably connected to the gear wheel 24 and the drive wheel 14, and by disconnecting it from either or both of these wheels the face plate or the tool head may be operated independently of each other.

On a shaft 26 extending from the front of the device and journaled in adjustable bearings 27 is fixed a gear wheel 28. This shaft has also fixed upon it a hand wheel 29 and stepped pulleys 30 over which runs a belt 31. The belt is driven from a drive pulley 32 fixed upon a shaft 33 which shaft may be driven from any suitable source of power. This permits the driving of the shaft 26 either by hand or by power. The gear wheel 28 is adapted to mesh with either a gear wheel 34 or 35. The gear wheel 34 is carried by a shaft 36 which carries a worm 37 which meshes with the worm gear 4 of the face plate 2, and when the gear 28 is thrown into engagement with the gear wheel 34 and the shaft 26 is rotated the face plate 2 will be rotated, and will in turn drive the gear 21 and operate the tool head by means previously described. The gear wheel 35 is fixed upon a shaft 38 which carries a beveled gear 39 which meshes with a beveled gear 40 carried by the lower end of a shaft 41 which extends upwardly through a rotatable standard 42 of the drilling press. The shaft 41 is provided at its upper end with a beveled gear 43 and through a suitable series of gears operates drilling mechanism 44. The drill press is also of the usual construction and it is not therefore thought necessary to describe in detail its various parts. Like the tool head stand the standard 42 supporting the drilling mechanism is mounted upon ball bearings 45 so that the drill press can be swung in a horizontal plane and brought immediately above or swung away from the face plate 2.

In order to throw the gear wheel 28 into engagement with either of the gear wheels 34 or 35, thus operating either the face plate or the face plate and tool head, or leaving both of these inoperative and driving the drilling mechanism only, the bearings 27 of the shaft 26 are adjustable and are constructed and operated in the following manner: A bracket 46 is secured upon the under side of the bed plate adjacent the front edge and this bracket is cut away midway its ends as shown at 47 and is also vertically slotted as shown at 48. The bearings 27 are provided with a depending portion 49 which extends downwardly through the slot 48, the bearings working in the cut-out portion 47 of the bracket 46. A shaft 50 passes transversely through the bracket 46 and through the slot 48, the extension 49 of the bearings 27 being fixed upon said shaft. This shaft rocks in the bracket 46 and is operated by means of a handle 51 which carries a hand operated gripping pawl 52, which engages a rack 53 carried by a side of the bracket. This rack is provided with two notches and by bringing the pawl 52 into engagement with the upper notch, the shaft 50 is rocked thus swinging the bearings 27 and the shaft 26 and locking the gear wheel 28 into engagement with the gear wheel 35. By moving the handle downwardly and bringing the pawl 52 into engagement with the lower notch of the rack 53, the shaft 50 is rocked in the other direction and the gear 28 is brought into engagement with the gear wheel 34. The details of this construction are shown in Figs. 6, 7 and 8, the last mentioned figure being a plan view of the bracket 46 with the shaft 50 and the bearings removed.

It will be obvious from the above description that a combined drilling and boring machine provided also with a cutting tool holder can be used in many ways, and is adapted for use in connection with metal working of various kinds, and will be found especially adapted for use in connection with engine houses, railroad repair shops, etc.

What I claim is:

1. In a device of the kind described, a bed plate, a bracket secured to the under side of said bed plate, the said bracket being centrally cut out and vertically slotted, a shaft passing transversely through the slotted portion of the bracket, a handle for operating said shaft, a locking pawl carried by said handle, a rack bar engaged by said pawl, a rotatable shaft parallel to the first mentioned shaft, bearings for the second mentioned shaft, an extension carried by said bearings, the bearings working in the cut-out portion of the bracket and the extension extending into the slot of the bracket and being fixed upon the first mentioned shaft, a gear wheel fixed upon the second mentioned shaft, and gear driven mechanisms arranged upon the bed plate, the drive gears of said mechanisms being arranged upon opposite sides of the gear first mentioned and in position to be engaged by it upon partial rotation of the first mentioned shaft.

2. A device of the kind described comprising a bed plate, a depending split sleeve, a face plate having teeth upon its under side, a depending face plate shaft, a portion of said shaft being journaled in the split sleeve, means for tightening the sleeve, a worm gear upon said shaft, a second shaft at right angles thereto, a gear on the second mentioned shaft, a third shaft parallel to the second mentioned shaft and movable toward and away from it, a gear upon the third shaft meshing with the gear upon the second shaft, a worm upon said second shaft meshing with the worm gear upon the face plate shaft, a tool stand revolubly mounted above the bed plate and swinging in a horizontal plane, a feed rod carried by said tool stand, a tool head working along said feed rod, and means driven by the teeth of the face plate for rotating said feed rods.

3. A device of the kind described comprising a bed plate, a vertically mounted rotatable drill press standard supported from a corner of said plate, drilling press mechanism carried thereby, a face plate supported immediately above the bed plate, a horizontally swinging tool stand supported above the bed plate and adapted to swing above the face plate, a tool head movable along said stand, means operated by rotation of the face plate for sliding the tool head along the tool head stand, a gear wheel driving the drill press mechanism, a gear wheel driving the face plate, shaft bearings swingingly supported between said last mentioned gears, means for swinging said bearings, a drive shaft mounted in said swinging bearings, and a gear wheel fixed upon the drive shaft in position to be swung into engagement upon movement of the bearings with either of the said drive gears, as and for the purpose set forth.

JOHN T. SHEROD.

Witnesses:
JOHN F. HINES,
PAUL E. HUFF.